United States Patent [19]

Sutton et al.

[11] 4,081,137
[45] Mar. 28, 1978

[54] FINNED SURFACE COOLED NOZZLE

[75] Inventors: Joel F. Sutton, Juno Isles; Allen R. Mattson, Palm Beach Gardens; Larry E. Anders, Palm Springs, all of Fla.

[73] Assignee: The United States of America as represented by the Secretary of the Air Force, Washington, D.C.

[21] Appl. No.: 756,941

[22] Filed: Jan. 5, 1977

[51] Int. Cl.² .................. B64C 15/06; B64D 33/04; F02K 1/12; F02K 11/02
[52] U.S. Cl. ............................... 239/127.3; 60/265; 239/265.39
[58] Field of Search ............ 60/265, 267; 244/117 A; 239/127.1, 127.3, 132.5, 265.33, 265.37–265.41

[56] References Cited

U.S. PATENT DOCUMENTS

| | | | |
|---|---|---|---|
| 2,801,516 | 8/1957 | Battle et al. | 239/127.1 X |
| 2,972,226 | 2/1961 | Geary | 239/265.39 |
| 2,984,068 | 5/1961 | Eatock | 239/265.37 |
| 2,989,845 | 6/1961 | Howald | 239/265.41 |
| 2,999,354 | 9/1961 | Gallo et al. | 239/265.41 |
| 3,979,065 | 9/1976 | Madden | 239/127.3 |

Primary Examiner—Bruce H. Stoner, Jr.
Assistant Examiner—Andres Kashnikow
Attorney, Agent, or Firm—Joseph E. Rusz; Arsen Tashjian

[57] ABSTRACT

An air-cooled, variable-throat, convergent-divergent nozzle for a turbojet engine. Active cooling constituent structures of the nozzle include: passages, for flow of cooling air, integral to, and within, convergent and divergent flaps and seal members; finned sections in nozzle components which are provided air from the passages; air exit slots on the convergent flaps; a hinged connection at each convergent flap-to-divergent flap (and divergent seal member) interconnection; staggered air outlet openings in each divergent flap; and, a tubular air feed system to provide cooling air from each divergent flap to an adjacent cooperating divergent seal member. Passive cooling is accomplished: by seal members overlapping adjacent side edges of convergent and divergent flaps, preventing leaking of cooling air and hot gas through the side edges; and, by a sealing hinged connection at each convergent flap-to-divergent flap (and divergent seal member) interconnection.

8 Claims, 16 Drawing Figures

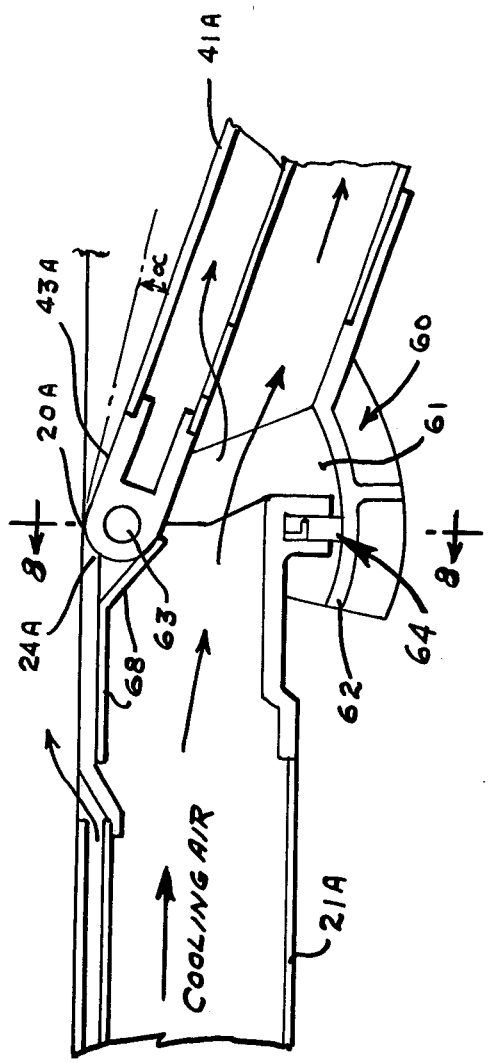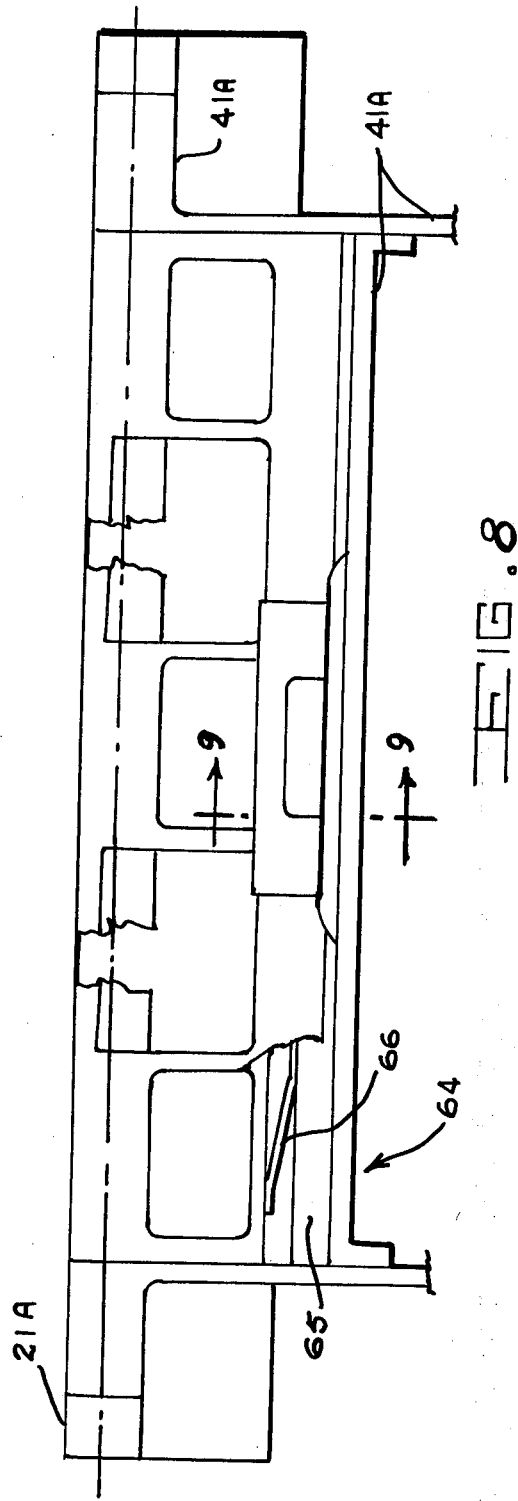

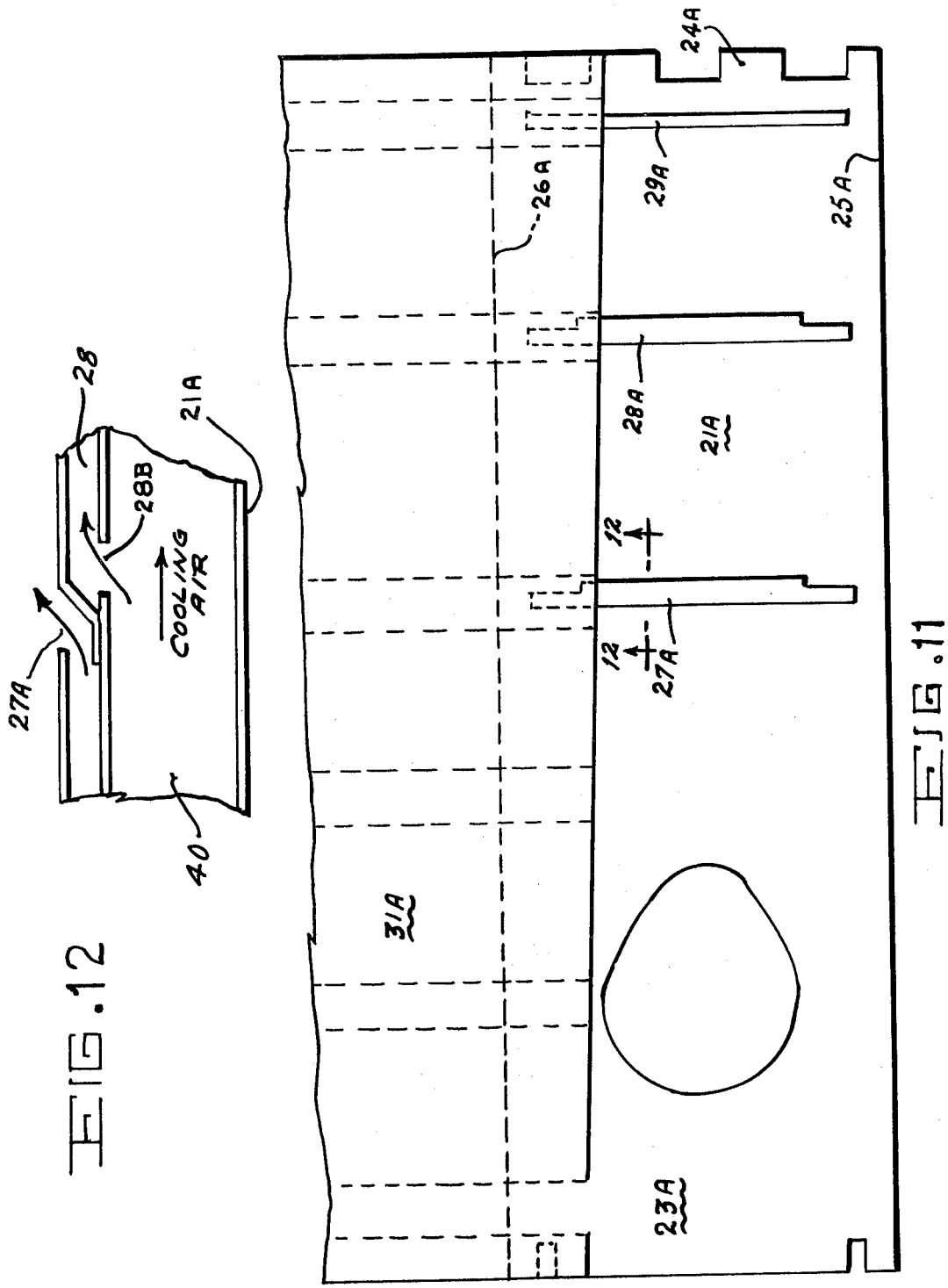

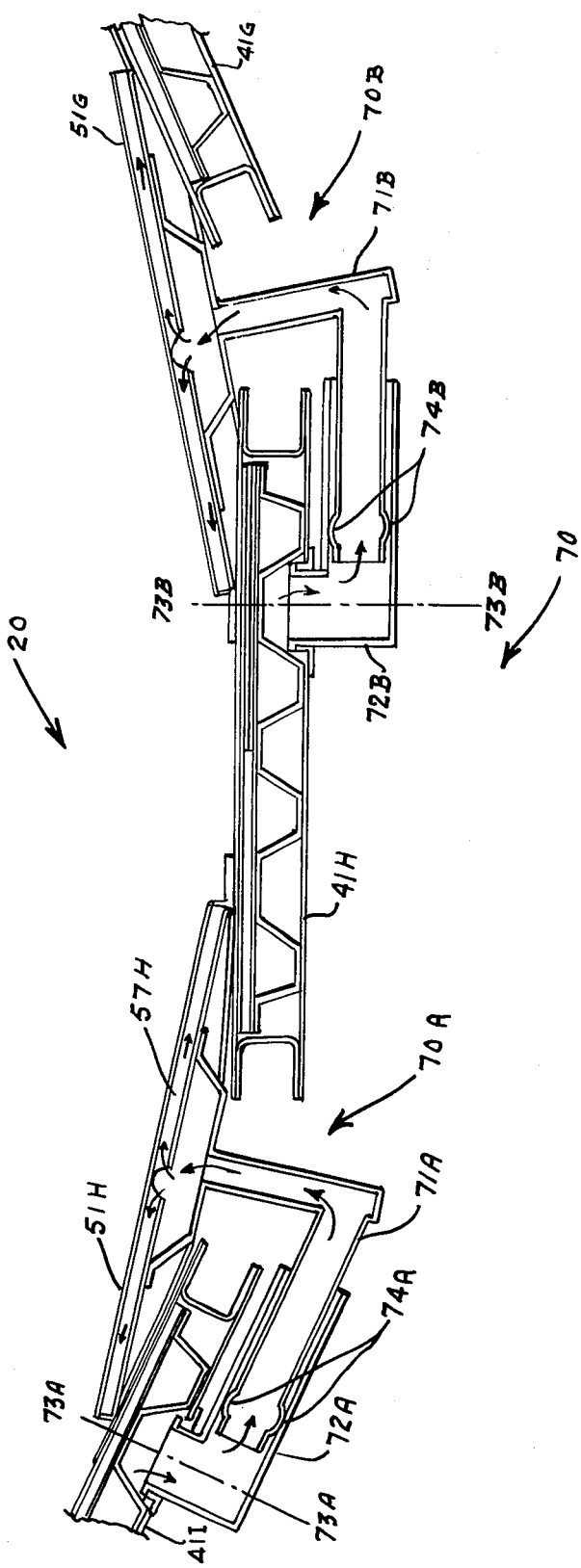

FINNED SURFACE COOLED NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates to a nozzle for a turbojet engine and, more particularly, to such a nozzle that is convergent-divergent, has a variable throat, and is air cooled (i.e., the hot gas stream surface of the nozzle is cooled by air).

The prior art method of cooling the convergent and divergent hot gas stream surface of a nozzle comprised cooling the convergent portion of the nozzle by using a liner, which was suported above the convergent portion of the nozzle, thus forming a passage for the cooling air (i.e., the fan duct air). The convergent cooling liner(s) extended from the end of the augmentor liner to the nozzle throat. The cooling air was then "dumped" onto the divergent section, to "film cool" that section.

There are two principal significant problems with regard to this method, and the structures used to perfom the method. Firstly, the convergent liner(s) warp severely, due to augmentor temperature gradient, thereby creating undesired leakage paths for the cooling air. Secondly, the cooling air boundary layer has difficulty turning around (i.e., going over) the sharp throat radius, thereby resulting in severe warping of the divergent section surface(s), preventing the divergent surface(s) from effectively forming an interface seal to hot gas stream leakage, and thereby creating performance losses and very short life for the convergent section liner(s) and the constituent portions of the divergent surface(s).

Our invention obviates these well known, and longstanding, problems of the prior art; and, therefore, our invention significantly advances the state-of-the-art.

SUMMARY OF THE INVENTION

Our invention is a unique and novel air-cooled, variable-throat, convergent-divergent nozzle for a turbojet engine.

Accordingly, the principal object of this invention is to teach the structure of a preferred embodiment of our inventive nozzle.

This principal object, as well as other related objects, of this invention will become readily apparent after a consideration of the description of the invention, together with reference to the Figures of the drawings.

DESCRIPTION OF THE DRAWINGS

FIG. 7 is an enlarged view, in simplified form, of what is enclosed within, and is designated by, circular line 7 in FIG. 5;

FIG. 8 is an enlarged, but simplified, view taken along line 8—8 of FIG. 7;

FIG. 11 is a top plan view, in simplified form, of a representative convergent flap member of our invention, together with a portion of a convergent seal member of our invention, showing their relative positional relationship, and a plurality of exit air slots in the convergent flap member;

FIG. 12 is an enlarged, but simplified, view taken along line 12—12 of FIG. 11;

It is to be noted with regard to the Figures of the drawings that, in the interest of maintaining simplicity and clarity of the Figures, cross sectioning has been omitted wherever it would unduly complicate and/or obscure a pertinent feature in that particular Figure.

DESCRIPTION OF THE PREFERRED EMBODIMENT

Figure 1:
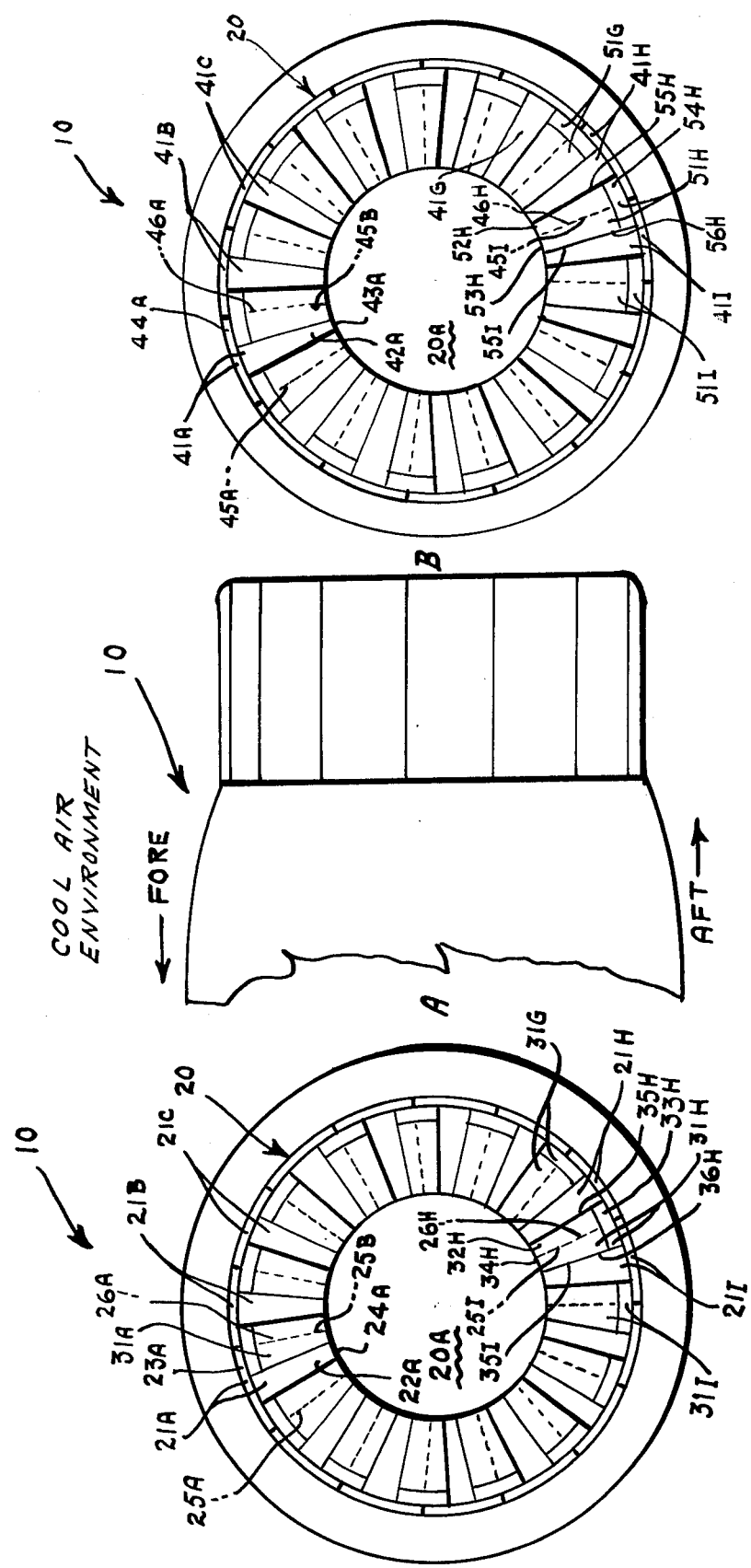
FIG. 1A is a side elevation view, partially fragmented and in simplified form, of the exterior of the aft portion of a turbojet engine, showing the nozzle end portion thereof.
FIG. 1B is an end view, from the fore end of the fragmented turbojet engine shown in FIG. 1A, showing a portion of a preferred embodiment of our invention.
FIG. 1C is an end view, from the aft end of the fragmented turbojet engine shown in FIG. 1A, showing another portion of the preferred embodiment of our invention.

With reference to FIG. 1A, therein is shown a side elevation view, partially fragmented and in simplified form, of the exterior of a turbojet engine 10 in which a preferred embodiment 20 of our inventive convergent-divergent nozzle is incorporated. The designations "Fore" and "Aft," together with their respective directional arrows, are shown in FIG. 1A to better orient the reader. The turboject 10 has a centrally located longitudinal axis A–B which is also the axis of our inventive nozzle 20.

The turbojet 10 is in a cool air environment, as shown; intakes cool air from that environment; and produces a discharge stream of hot gas within our inventive convergent-divergent nozzle 20, as will be shown later herein.

It is to be noted, and to be remembered, that in an oversimplified overview, our inventive nozzle 20, FIG. 1A, includes, as will be shown later herein: a plurality of hollow, movable convergent flaps; a plurality of hollow movable divergent flaps hinged to the convergent flaps; means for sealing and for preventing the leaking of air and hot discharge gas between the convergent flaps, the divergent flaps, and their interconnection, with that means including a first plurality hollow, movable seal members, in the structural form of convergent flaps, connected to, abutting with, and axially inward of the convergent flaps; and a second plurality of hollow, movable seal members, in the structural form of divergent flaps, connected to, abutting with, and axially inward of the divergent flaps, with this second plurality of seal members hinged to the first plurality of seal members; and, means for cooling the nozzle or, more accurately, for cooling the constituent components of the nozzle (i.e., the convergent flaps, the divergent flaps, the convergent flap-divergent flap and seal member interconnection, the first plurality of seal members, and the second plurality of seal members) with the cooling means including: passages in the convergent flaps and in the divergent flaps; passages in the first and second plurality of seal members; a hinged manifold system for cooling the divergent flaps and the second plurality of seal members; exit air slots in each convergent flap; staggered air outlets in each divergent flap; and, a swivel joint connecting cool air from each divergent flap to a corresponding divergent seal.

In FIG. 1B, an end view from the fore end of the turbojet 10, can be seen a plurality (preferably 15) of convergent nozzle flaps, such as representative ones 21A-21C, of our inventive convergent-divergent nozzle 20. Each convergent nozzle flap, such as 21A, of the plurality has an inner surface 22A, an upstream end 23A, a downstream end 24A, a first side edge 25A, and a second side edge 26A. The convergent flaps are disposed adjacent to each other in a second side edge-to-first side edge position (e.g., second side edge 26A of convergent flap 21A is adjacent to, and abuts, first side edge 25B of convergent flap 21B); and, an annular surface thereby is formed.

Still with FIG. 1B, therein also is shown a first plurality of seal members, such as representative ones 31G-31I, in the form of convergent flaps. Each convergent flap-shaped seal member, such as representative one 31H, has an inner surface 32H, an upstream end 33H, a downstream end 34H, a first side edge 35H, and a second side edge 36H. The convergent flap-shaped seal members are disposed adjacent to each other in a second side edge-to-first side edge position (e.g., second side edge 36H of convergent flap-shaped seal member 31H is adjacent to, but need not abut, first side edge 35I of convergent flap-shaped seal member 31I). Additionally, each convergent flap-shaped seal member, such as representative onwe 31H, is connected to, and abuts, the two adjacent convergent flaps (e.g, such as convergent flaps 21H and 21I in the case of seal member 31H) and is disposed axially along the adjacent side edges 26H and 25I of, respectively, convergent flaps 21H and 21I) in annular fashion.

Of course, both the plurality of convergent nozzle flaps (of which 21A is a representative one) and the first plurality of seal members (or which convergent flap-shaped seal member 31H is a representative one) are movable and, as will be shown later herein, are hollow.

Also shown in this FIG. 1B is the throat 20A of the nozzle 20.

Now, with reference to FIG. 1C, an end view from the aft end of the turbojet 10, can be seen a plurality (preferably 15) of divergent nozzle flaps, such as representative ones 41A-41C, of our invention convergent-divergent nozzle 20. Each divergent nozzle flap, such as representative one 41A, of the plurality has a respective cooperating convergent nozzle flap, such as representative one 21A, FIG. 1B. Also, each divergent nozzle flap, such as 41A, of the plurality also has an inner surface 42A, an upstream end 43A, a downstream end 44A, a first side edge 45A, and second side edge 46A. The divergent flaps are disposed adjacent to each other in a second side edge-to-first side edge position (e.g., second side edge 46A of divergent flap 41A is adjacent to, and abuts, first side edge 45B of divergent flap 41B); and, an annular surface is thereby formed, as in the case of the convergent nozzle flaps, FIG. 1B.

Still with FIG. 1C, therein also is shown a second plurality of seal members, such as representative ones 51G-51I, in the form of divergent flaps. Each divergent flap-shaped seal member, such as representative one 51H, has an inner surface 52H, an upstream end 53H, a downstream end 54H, a first side edge 55H, and a second side edge 56H. The divergent flap-shaped seal members are disposed adjacent to each other in a second side edge-to-first side edge position (e.g., second side edge 56H of divergent flap-shaped seal member 51H is adjacent to, but need not abut, first side edge 55I of divergent flap-shaped seal member 51I). Additionally, each divergent flap-shaped seal member, such as representative one 51H, is connected to, and abuts, the two adjacent divergent flaps (e.g., such as divergent flaps 41H in 41I in the case of seal member 51H) and is disposed axially along the adjacent side edges 46H and 45I of, respectively, divergent flaps 41H and 41I) in annular fashion.

Similarly to the divergent flaps and the divergent seals, FIG. 1B, both the plurality of divergent flaps (of which 41A is a representative one) and the second plurality of seal members (of which divergent flap-shaped seal member 51H is a representative one) are movable and, as will be shown later herein, are hollow.

Also shown in this FIG. 1C is the throat 20A of the nozzle 20.

Figure 2:
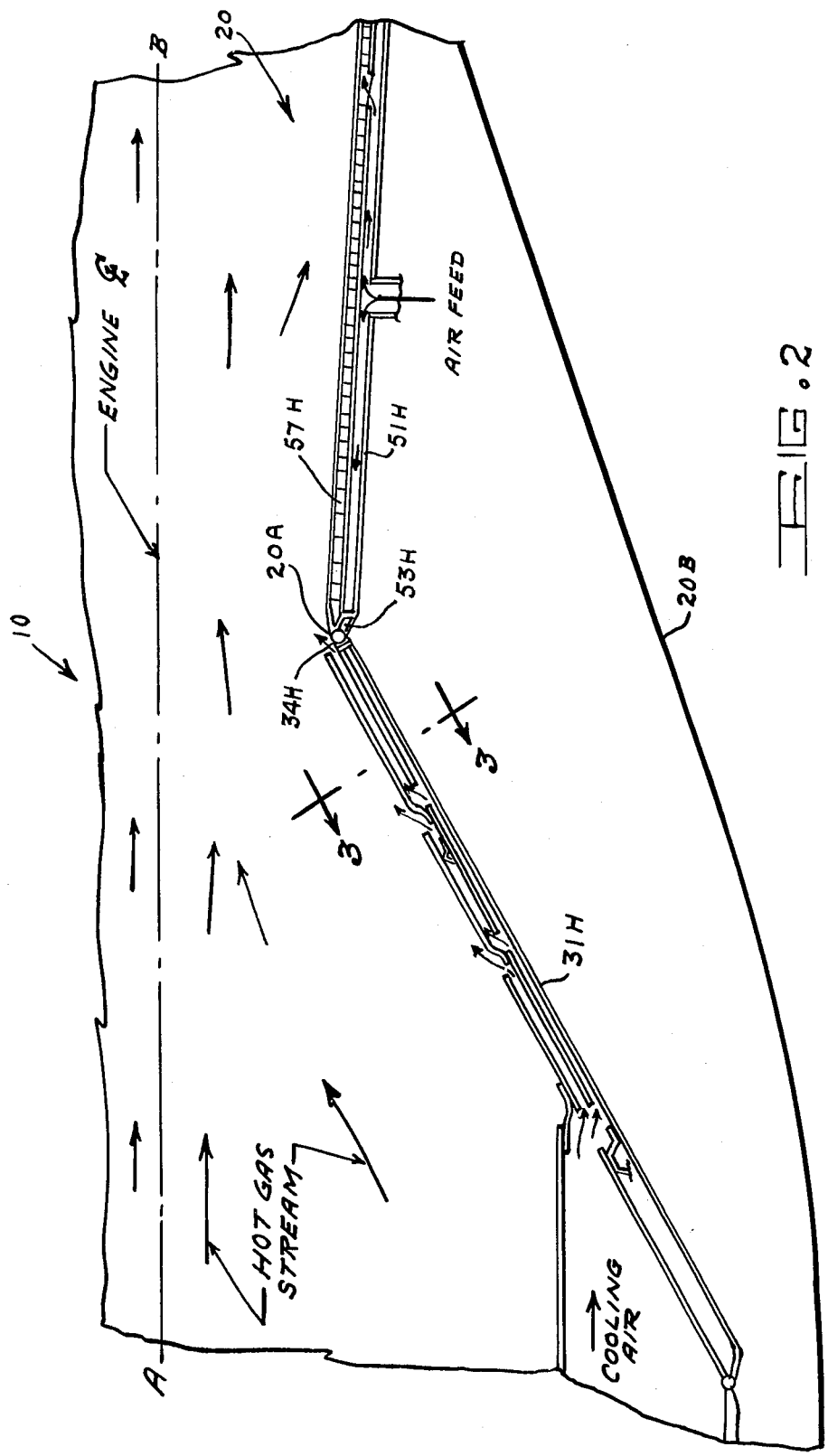
FIG. 2 is a side elevational view, in cross sectional form and partially fragmented, of a portion of a preferred embodiment of our invention, showing a representative convergent seal member and its corresponding cooperating divergent seal member.

With reference to FIG. 2, therein is shown a longitudinal section (of a lower portion of our inventive nozzle 20) taken at and through a representative convergent flap-shaped seal member 31H, the corresponding cooperating divergent flap-shaped seal member 51H to which seal member 31H is hinged, and their hinged connection at the throat 20A of the nozzle 20. As can be seen, both seal member 31H and 51H are hollow.

Also shown in FIG. 2 are: the centrally located longitudinal axis A—B, which of course is also the center line of the turbojet engine 10, and also is the longitudinal axis of the nozzle 20; the downstream end 34H of seal member 31H; the upstream end 53H of seal member 51H; the external contour 20B of the nozzle 20; the cooling air, so legended, that is being taken in by the turbojet 10 from the environment; and, the discharge stream of hot gas, so legended, produced by the turbojet 10 and flowing within the nozzle 20 and over the inner surface thereof.

Figure 3:
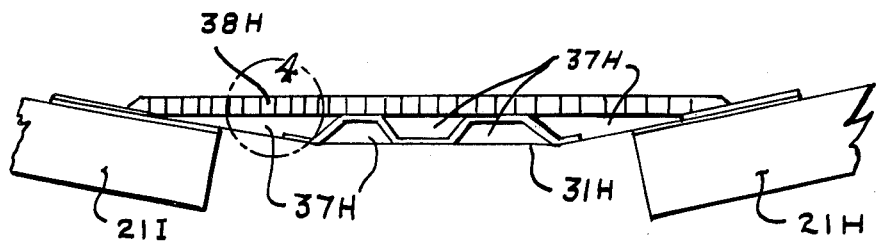
FIG. 3 is an enlarged, but simplified, view taken along line 3—3 of FIG. 2.

Now, with reference to FIG. 3 which is an enlarged, but simplified, view taken along line 3—3 of FIG. 2, therein can be seen (in sectional form) representative convergent flap-shaped seal member 31H with its corrugated manifold 37H and its plurality of axially aligned cooling air passages of which 38H is a representative one.

It is to be noted that each of the convergent flap-shaped seal members, of which 31H is the representative one, is disposed adjacent to the corresponding convergent flaps, such as 21H and 21I in this situation.

Figure 4:
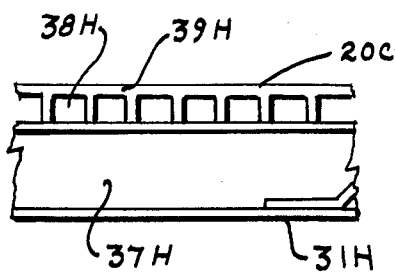
FIG. 4 is an enlarged view, in simplified form, of what is enclosed within, and is designed by, circular line 4 in FIG. 3.

In FIG. 4 is shown the enlarged, but simplified, view of what is enclosed within, and what is designed by, circular line 4 in FIG. 3. In FIG. 4 are shown: the hot gas path surface 20C, which in effect is the inner surface of the nozzle 20; and, the representative seal member 31H, with a portion of its corrugated manifold 37H and the representative one 38H of its plurality of axially aligned cooling air passages. With reference to said cooling air passages, such as 38H, it is to be noted that the finned wall structure, generally designated 39H, defines and limits the plurality of cooling air passages, such as 38H. Said finned wall structure 39H is affixed to the convergent flap-shaped seal member 31H, preferably by bonding or by brazing, and therefore is integrated with, and is integral to, the seal member 31H. It is to be noted that, although the sectional form only of representative convergent flap-shaped seal member 31H has been described, the sectional form of the other convergent flap-shaped seal members, FIG. 1B, is identical.

Figure 5:
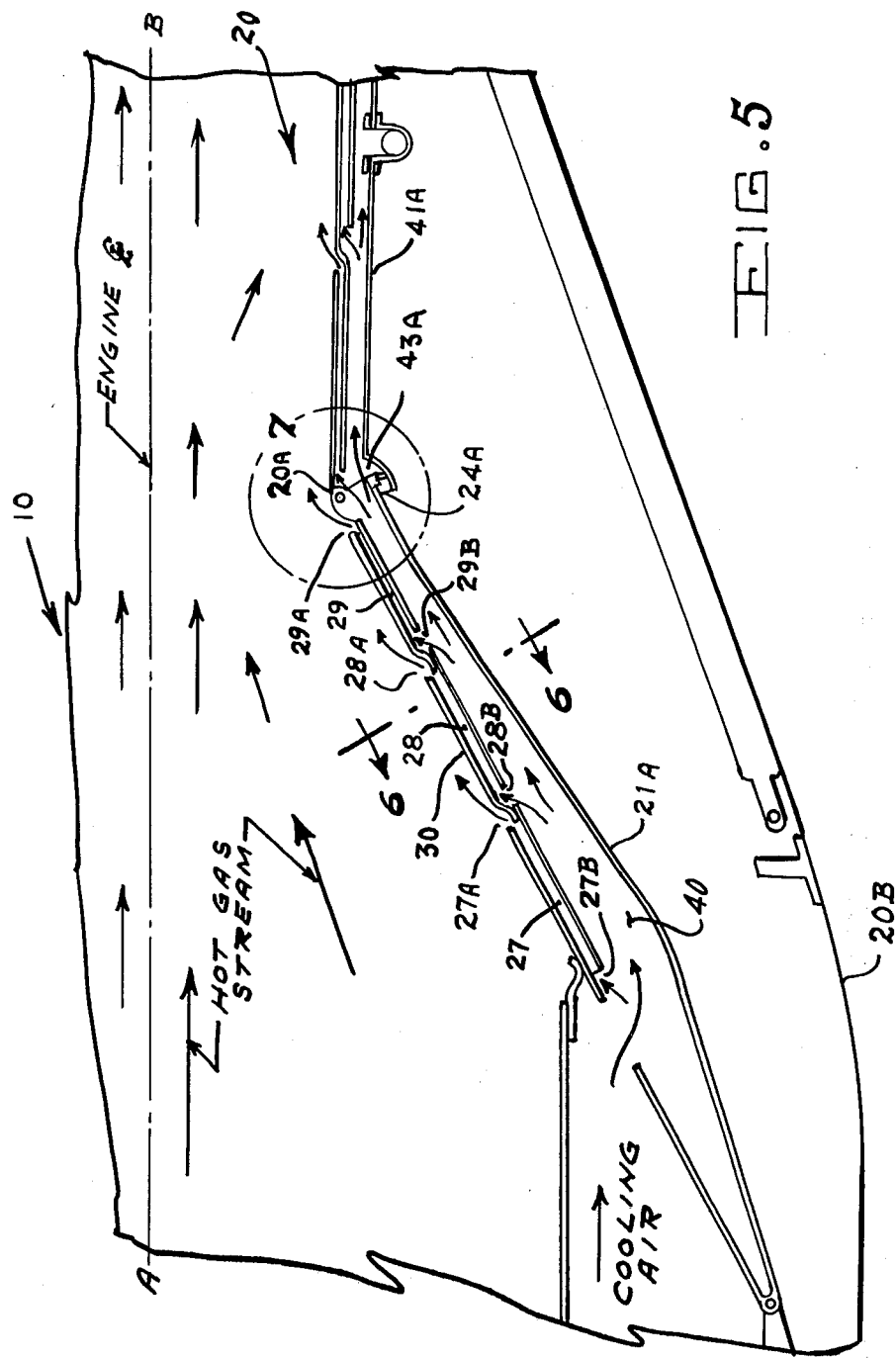
FIG. 5 is another side elevation view, in cross-sectional form and partially fragmented, of a portion of a preferred embodiment of our invention, showing a representative convergent flap and its corresponding cooperating divergent flap.

Now, the reference to FIG. 5, therein is shown a longitudinal section (or a portion of our inventive nozzle 20) taken at and through a representative convergent flap 21A, the corresponding cooperating divergent flap 41A to which convergent flap 21A is hinged, and their hinged connection at the throat 20A of nozzle 20. As can be seen, both flaps 21A and 41A are hollow.

Also shown in FIG. 5 are: the centrally located longitudinal axis A—B of the turbojet 10 and of the nozzle 20; the downstream end 24A of convergent flap 21A; the upstream end 43A of divergent flap 41A; the external contour 20B of the nozzle 20; the cooling air intaken or ingested by the turbojet 10 from the environment; and, the discharge stream of hot gas produced by the turbojet 10 and flowing within the nozzle 20 and over the inner surface thereof.

Figure 6:
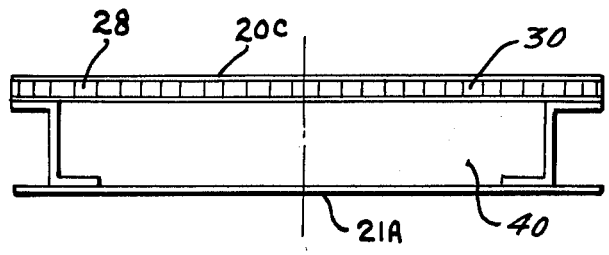
FIG. 6 is an enlarged, but simplified, view taken along line 6—6 of FIG. 5.

With reference to FIG. 6 which is an enlarged, but simplified, view taken along line 6—6 of FIG. 5, therein can be seen (in sectional form) representative convergent flap 21A with its manifold 40; the hot gas path surface 20C which, in effect, is the inner surface of nozzle 20; a representative one 28 of the plurality of convergent flap axial cooling air passages 27, 28 and 29 as shown in FIG. 5; the finned wall structure 30 which defines and limits the plurality of axial cooling air passages, such as 28. Said finned wall structure 30 is affixed to the convergent flap 21A, preferably by bonding or by brazing, and therefore is integrated with, and is integral to, the convergent flap 21A. It is to be noted that, in the interest of brevity, the finned wall structure 30 will be referred to hereinafter as the "convergent flap liner." It is also to be noted and remembered that, although the sectional form only of representative convergent flap 21A has been described, the sectional form of the other convergent flaps, FIG. 1B, is identical.

Now, with reference to FIG. 7, therein is shown in greater detail and enlarged, but still simplified, what is enclosed within, and is designated by, circular line 7 in FIG. 5. In FIG. 7 as shown: the cooling air; the representative convergent flap 21A; the representative divergent flap 41A; and, the hinged connection, generally designated 60, between the representative divergent flap 41A (at its upstream end 43A) and its representative respective cooperating corresponding convergent flap 21A (at its downstream end 24A). It is to be noted that the hinged connection 60 (hereinafter referred to as the "hinge seal") includes: a hinge 61 integral to divergent flap 41A, and having a ridge 62 thereon; a pivot 63 about which the divergent flap 41A travels (or is otherwise movable) through an angle α which is the full (i.e., maximum) angular range of movement of the divergent flap 41A (as well as the other divergent flaps of the plurality, thereby defining the area of the jet through the turbojet engine 10); and, a wiper edge seal, generally designated 64, which is complementary to, and sealingly mates with, the ridge 62 on the hinge 61 and is integral to representative convergent flap 21A. The wiper edge seal 64 will be shown, and described, in detail later herein.

With reference to FIG. 8 which is an enlarged, but simplified, view taken along line 8—8 of FIG. 7, therein can be seen the structural relationship between the representative convergent flap 21A and the representative divergent flap 41A at the "hinge seal" 60 (i.e., hinged connection) previously shown in FIG. 7.

Figure 9:
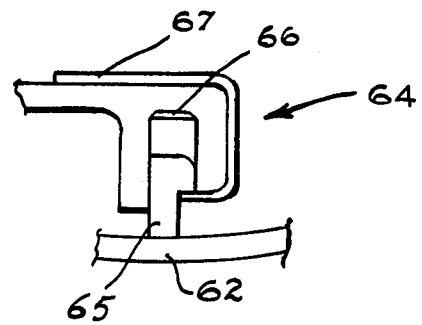
FIG. 9 is an enlarged, but simplified, view taken along line 9—9 of FIG. 8.

Now, with reference to FIG. 9 therein is shown enlarged and in detail, but still in simplified form, the wiper edge seal 64 previously discussed with reference to FIG. 8. The view is as seen along line 9—9 of FIG. 8. The wiper edge seal 64 (or, more accurately, the wiper edge seal assembly) includes: a "knife" (i.e., sharp) edge seal 65; means for biasing the seal 65, such as spring 66; and, a suitable holding means such as a clip, for retaining the knife edge seal 65 and the clip 67 to each other and to the convergent flap 21A. In this regard, it is to be noted that the wiper edge seal assembly 64 is integral to the convergent flap 21A at the downstream end 24A; and, that if additional sealing is desired, it can be provided by a cantilever spring, such as 68, FIG. 7, which is interposed between, and abuts, the downstream end 24A of convergent flap 41A, and is integral to the convergent flap 21A.

Figure 10:
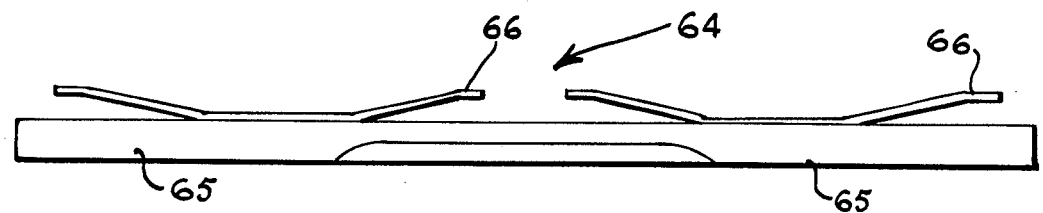
FIG. 10 is an enlarged, but simplified view, of a knife edge seal component of our invention.

With reference to FIG. 10, therein is shown an enlarged, but simplified, front view of the knife edge seal 65 and of the spring 66 referred to hereinabove with regard to the wiper edge seal assembly 64 shown in FIGS. 8 and 9.

In FIG. 11 is shown, in a top plan view and in simplified form, representative convergent flap 21A with upstream end 23A, downstream end 24A, first side edge 25A, and second side edge 26A. On top of, abutting, and overlapping, second side edge 26A of convergent flap 21A is convergent flap-shaped seal 31A (see also FIG. 1B). Also shown in this Figure is the plurality, preferably three, of exit air slots 27A, 28A and 29A (or "dump" air slots) in the convergent flap 21A. In this regard, see also FIG. 5. It is here to be noted that the arrangement shown in this Figure is representative of the identical arrangement of the others of the plurality of convergent flaps and of the plurality of convergent flapshaped seal members (see FIG. 1B).

Now, with reference to FIG. 12, therein is shown an enlarged, but simplified, view taken along line 12—12 of FIG. 11. Therein can be seen the representative convergent flap 21A, cooling passage 27 with "dump" air slot 27A, and air feed slot 28B which directs air from manifold 40 of convergent flap 21A into cooling passage 28. In this regard, see also FIG. 5 which shows in spaced relationship said manifold 40, cooling passages 27, 28 and 29, and air feed slots 27B, 28B and 29B of convergent flap member 21A.

Figure 13:
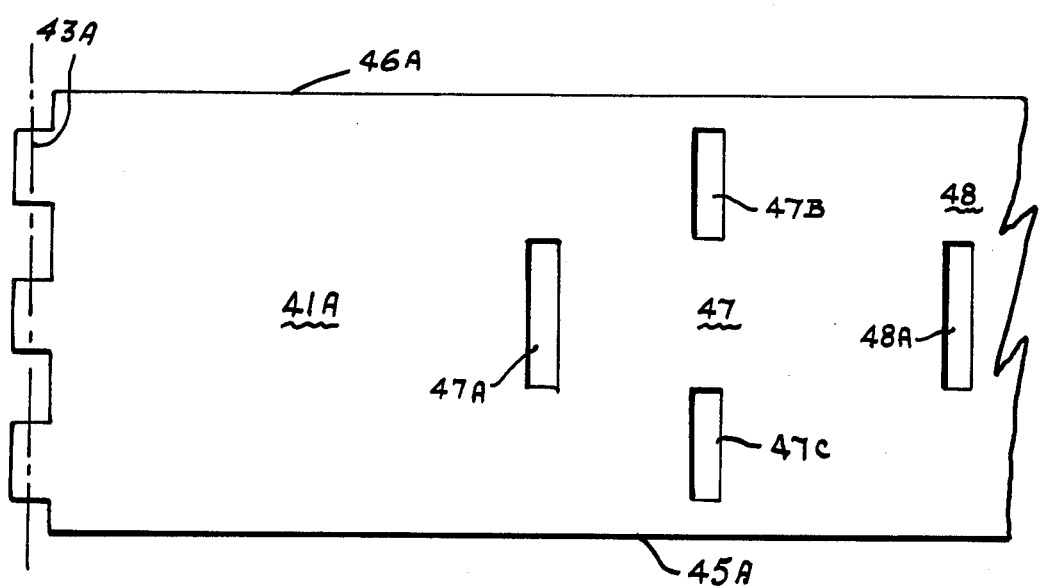
FIG. 13 is a top plan view in simplified form, of a representative divergent flap member of our invention, showing a plurality of locations thereon where a plurality of air outlet openings are in staggered relationship; and, FIG. 14 is a simplified view, in sectional form and fragmented, of the aft end of the nozzle showing the means by which cooling air is supplied to representative divergent seal members by corresponding cooperating adjacent divergent flaps.

FIG. 13 is a top plan view, in simplified form, and partially fragmented, of representative divergent flap 41A, with upstream end 43A, first side edge 45A, and second side edge 46 (see also FIGS. 1B and 5). Also shown in FIG. 13 is the plurality of locations, such as the locations generally designated 47 and 48, on and in divergent flap 41A whereat are a plurality of exit cooling air outlets (or "dump" outlets), preferably three, such as 47A, 47B and 47C are positioned in a staggered relationship. Although only two locations 47 and 48 on divergent flap 41A are shown, three such locations are preferred but are not necessary. It is here to be noted that the arrangement shown in this Figure is representative of the identical arrangement of the others of the plurality of divergent flaps (see FIG. 1C).

Now, with reference to FIG. 14, therein is shown a simplified end view, in sectional form, of the aft end (i.e., the divergent end) of the nozzle 20, showing the structural manner by which cooling air is supplied to representative divergent flap-shaped seal members 51G and 51H which are atop of, and abut, respectively representative divergent flaps 41G and 41H, and 41I and 41H (see also FIGS. 1C and 2).

The means, generally designated 70, for feeding cooling air (shown by directional arrows in this Figure) from each divergent flap, such as 41I and 41H, to an adjacent divergent seal member of the second plurality of seal members (i.e., divergent flap-shaped seal members), such as 51H and 51G, comprises in effect, a plurality of identical swivel joint pipe supply systems, with one system for each of the divergent flap-to-adjacent divergent flap-shaped seal member connection. Two such representative systems 70A and 70B, of the plurality of systems are shown in FIG. 14. As can be seen, system 70A is for the divergent flap 41I connection to divergent flap-shaped seal 51H; and, system 70B is for the divergent flap 41H connection to divergent flap-shaped seal 51G.

Each system, such as representative one 70A (see also FIG. 2) includes: a male tube, such as 71A, which is rigidly connected to the respective divergent flap-shaped seal member, such as 51H, allowing cooling air to flow into the manifold formed by the structure of the seal 51H; and, a female elbow tube member, such as 72A, that is pivotally attached to the respective divergent flap 41I at one end and mates with the male member 71A at the other end. The "bayonet" arrangement of the male and female members, 71A and 72A, combined with the pivot motion of pivotally attached female member 72A about its pivot axis, 73A—73A, provides the required degrees of freedom for this joint. A seal, such as 74A, interposed between male member 71A and female member 72 may be provided, but is not necessary. It is here to be noted that the finned wall cooling passages, such as 57H (see also FIG. 2), of each divergent flap-shaped seal member, such as 51H, are transverse (see direction of cooling air flow in this Figure) to the flow path of the hot gas stream in the turbojet engine (i.e., out of the Figure surface and toward the reader). System 70B, which is identical to system 70A, is shown and includes: male member 71B connected to seal member 51G; and, female member 72B pivotally attached to divergent flap 41H at one end, and mates with male member 71B at the other end. Also shown are electively usable seal 74B, and pivot axis 73B—73B of female member 72B.

MANNER OF OPERATION OF THE PREFERRED EMBODIMENT

The manner of operation of our inventive nozzle 20 can be very easily ascertained by a person of ordinary skill in the art from the foregoing description, together with reference to the Figures of the drawings.

For others, it is sufficient to say in explanation that our novel nozzle 20 is actively cooled by a multiplicity of different structural members integrated into the nozzle 20, and is passively cooled by preventing leakage of coolant air and/or of hot gas between adjacent convergent flaps, adjacent divergent flaps, and at the hinged connection between convergent flaps and divergent flaps.

More specifically, active cooling is promoted and accomplished as follows: the cooling air enters the convergent seal member 31H, FIG. 2, with the convergent seal cross section, FIGS. 3 and 4, serving as a manifold 37H for the cooling air, and with the finned wall 39H providing convective cooling of the inner wall of the convergent seal 37H. To prevent the cooling air from heating up over the length of the convergent seal member 31H, the finned wall has outlets which "dump" cooling air, thereby creating a boundary layer that provides some film cooling of the inner wall. This allows the finned wall to be replenished with cool air from the convergent seal member manifold 37H, FIG. 3, along the length of the convergent seal member 31, FIG. 2. The convergent flap 21A, FIG. 5, is similarly cooled. Cooling air for the divergent flap 41A, FIG. 5, and for the divergent seal 51H. FIG. 2, is ducted through the convergent flap 21A, FIGS. 5 and 6, only, passing through the inside of the convergent flap 21A, and is transferred to the divergent flap 41A, FIG. 5, at the nozzle throat 20A, FIG. 5, using hinge connection 60, FIG. 7. Sealing of the hinge connection 60 over the angular travel α of the divergent flap 41A, FIG. 7, in relation to the convergent flap 21A, is accomplished with the wiper edge seal 64, FIGS. 7, 8, 9 and 10. Cooling of the divergent flap 41A is accomplished similarly to the cooling of convergent flap 21A. With the convergent flap structure acting as a supply manifold, cooling air is supplied to the axially oriented finned wall passages on the divergent flap 41A, FIG. 5, and is "dumped" into the flow stream at equally spaced locations (preferably 3 such locations), FIG. 13, providing additional film cooling of the inner gas stream surface of the divergent flap 41A, FIGS. 5 and 13. Cooling air is supplied to the divergent seal members, such as 51H, FIGS. 2 and 14, by use of the plurality of identical swivel joint pipe supply systems, such as 70A, FIG. 14.

Passive cooling is accomplished with: the use of convergent and divergent seal members, such as 31H and 51H, FIG. 2, to overlap adjacent side edges of convergent flaps, FIG. 1B, and adjacent side edges of divergent flaps, FIGS. 1C and 14, and, thereby prevent leaking of air and/or of hot gas between these adjacent side edges; and, the use of sealing hinged connection 60, FIG. 7, to prevent leaking of air and/or of hot gas at the convergent flap-to-divergent flap (and divergent seal member) interconnection.

CONCLUSION

It is abundantly clear from all of the foregoing, and from the Figures of the drawings, that the principal object, as well as other related objects (such as: cooling flaps without the use of additional parts, members, or the like; film cooling inner liner walls by "dumping" cooling air along the hot gas flow path; providing a unique sealed hinged connection; cooling divergent seal members at the nozzle throat area with a novel translating bayonet fixture free to rotate about a flap pivot axis; and, cooling divergent seal members by orienting finned wall passages tranverse to the hot gas stream) have been attained.

It is to be noted that, although there have been described the fundamental and unique features of our invention as applied to a particular preferred embodiment 20, various other embodiments, adaptations, substitutions, additions, omissions, and the like may occur to, and can be made by, those of ordinary skill in the art, without departing from the spirit of our invention.

What is claimed is:

1. An air-cooled, variable-throat, convergent-divergent nozzle for a turbojet engine having an inner surface and a centrally located longitudinal axis, wherein said turbojet engine is in a cool air environment and intakes cool air from said environment, and wherein said turbojet engine produces a discharge stream of hot gas within said nozzle and the stream of hot gas flows over the inner surface of the nozzle, comprising:
   a. a plurality of hollow, movable convergent nozzle flaps, with each convergent flap of said plurality having an inner surface, an upstream end, a downstream end, a first side edge, and a second side edge, and with said convergent flaps disposed adjacent to each other in a second side edge-to-first side edge position, whereby an annular surface is formed;
   b. a plurality of hollow, movable divergent nozzle flaps, one divergent flap for each one of the plurality of convergent flaps, with each divergent flap of said plurality having an inner surface, an upstream end, a downstream end, a first side edge, and a second side edge, and with said divergent flaps disposed adjacent to each other in a second side edge-to-first side edge position, whereby an annular surface is formed, and also with the upstream end of each divergent flap hinged to the downstream end of its respective cooperating corresponding convergent flap;
   c. means for sealing and for preventing the leaking of air and hot gas between adjacent side edges of said convergent flaps, and between adjacent side edges of said divergent flaps, and also between the upstream end of each divergent flap hinged to the downstream end of its respective cooperating corresponding convergent flap, with said sealing and leaking preventing means connected to said convergent flaps and to said divergent flaps and disposed axially along said adjacent side edges of said convergent flaps and said divergent flaps;
   d. and, means for cooling said inner surface of said nozzle over which the stream of hot gas flows.

2. A nozzle, as set forth in claim 1, wherein said sealing and leaking preventing means includes:
   a. a first plurality of seal members in the form of hollow, movable convergent flaps having an inner surface, an upstream end, a downstream end, a first side edge, and a second side edge, and with said convergent seal members disposed adjacent to each other in a second side edge-to-first side edge position in annular fashion, and also with said convergent seal members disposed adjacent to convergent flaps of said plurality of convergent flaps;
   b. and, a second plurality of seal members in the form of hollow, movable divergent flaps, one divergent seal member for each one of the plurality of convergent seal members, with each divergent seal member having an inner surface, an upstream end, a downstream end, a first side edge, and a second side edge, and with said divergent seal members disposed adjacent to each other in a second side edge-to-first side edge position in annular fashion, and also with the upstream end of each divergent seal member hinged to the downstream end of its respective cooperating corresponding convergent seal member, and also with said divergent seal members disposed adjacent to said divergent flaps of said plurality of divergent flaps.

3. A nozzle, as set forth in claim 2, wherein said means for cooling said inner surface over which said stream of hot gas flows, includes:
   a. a plurality of cooling passages integral to each convergent flap of said plurality of convergent flaps;
   b. a plurality of cooling passages integral to each divergent flap of said plurality of divergent flaps;
   c. a plurality of cooling passages integral to each convergent seal member of said plurality of convergent seal members;
   d. a plurality of cooling passages transverse to the axis of the nozzle and integral to each divergent seal member of said plurality of divergent seal members;
   e. means for interconnecting said plurality of convergent flap cooling passages to said plurality of divergent flap cooling passages, and to said plurality of divergent seal members;
   f. a plurality of exit air slots in each convergent flap of said plurality of convergent flaps;
   g. a plurality of air outlets in a plurality of locations on and in each divergent flap of said plurality of divergent flaps, with said divergent flap air outlets in a staggered relationship to each other at each of said plurality of locations;
   h. and, means for feeding cooling air from each divergent flap of said plurailty of divergent flaps to an adjacent divergent seal member of said second plurality of seal members.

4. A nozzle, as set forth in claim 3, wherein said means for interconnecting said plurality of convergent flap cooling passages to said plurality of divergent flap cooling passages, and to said plurality of divergent seal members includes a plurality of sealed hinged connections wherein each sealed hinged connection is between a convergent flap and a corresponding cooperating divergent flap, and between said convergent flap and a corresponding cooperating divergent seal, wherein each sealed hinged connection includes:
   a. a hinge integral to said divergent flap, with said hinge having a ridge thereon;
   b. a pivot about which said divergent flap is movable angularly;
   c. and, a wiper edge seal which is complementary to, and sealingly mates with, said ridge on said hinge, with said wiper edge seal integral to said convergent flap and comprising:
      (1) a knife edge seal;
      (2) means for biasing said knife edge seal;
      (3) means for holding and retaining said knife edge seal and said biasing means to each other and to said convergent flap.

5. A nozzle, as set forth in claim 4, wherein said means for biasing said knife edge seal is a spring, and wherein said means for holding and retaining said knife edge seal and said biasing means to each other and to said convergent flap is a retaining ring.

6. A nozzle, as set forth in claim 5, wherein each such system further includes a seal interposed between the male tube and the female elbow tube.

7. A nozzle, as set forth in claim 4, wherein said interconnecting means further includes a cantilever spring which is interposed between, and abuts, the downstream end of the convergent flap and the upstream end of the divergent flap, and is integral to the convergent flap.

8. A nozzle as set forth in claim 3, wherein said means for feeding cooling air from each divergent flap of said plurality of divergent flaps to an adjacent divergent seal member of said second plurality of seal members connected to said divergent flap, includes a plurality of identical swivel joint pipe supply systems, with one such system for each divergent flap-to-adjacent divergent seal member connection, wherein each such system comprises:

a. a male tube rigidly connected to the divergent seal member;

b. and, a female elbow tube having two ends, with one end pivotally attached to the divergent flap, and with the other end mating with the male tube.

* * * * *